Dec. 15, 1942.　　D. PETERKIN, JR., ET AL　　2,304,952
CLUTCH CONTROL FOR AUTOMATIC DISPENSING DEVICE
Filed May 8, 1939　　5 Sheets-Sheet 1
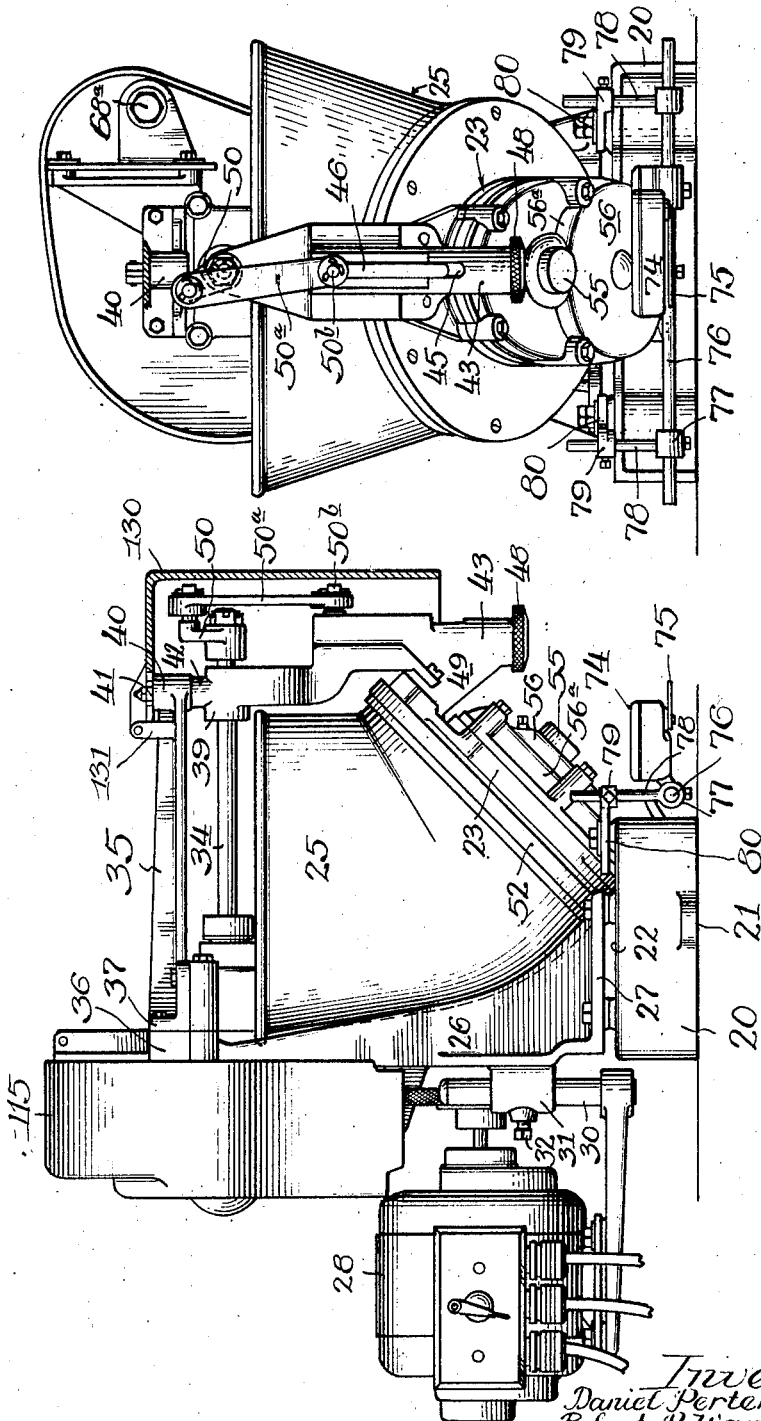
Inventors
Daniel Peterkin Jr.
Robert P. Warren
and John M. Binding Dec. 15, 1942. D. PETERKIN, JR., ET AL 2,304,952
CLUTCH CONTROL FOR AUTOMATIC DISPENSING DEVICE
Filed May 8, 1939 5 Sheets-Sheet 2

Inventors.
Daniel Peterkin Jr.
Robert P. Warren
and John M. Byrding.
Offield Melhope Scott & Poole Attys Witness:
Chas. F. Lourish

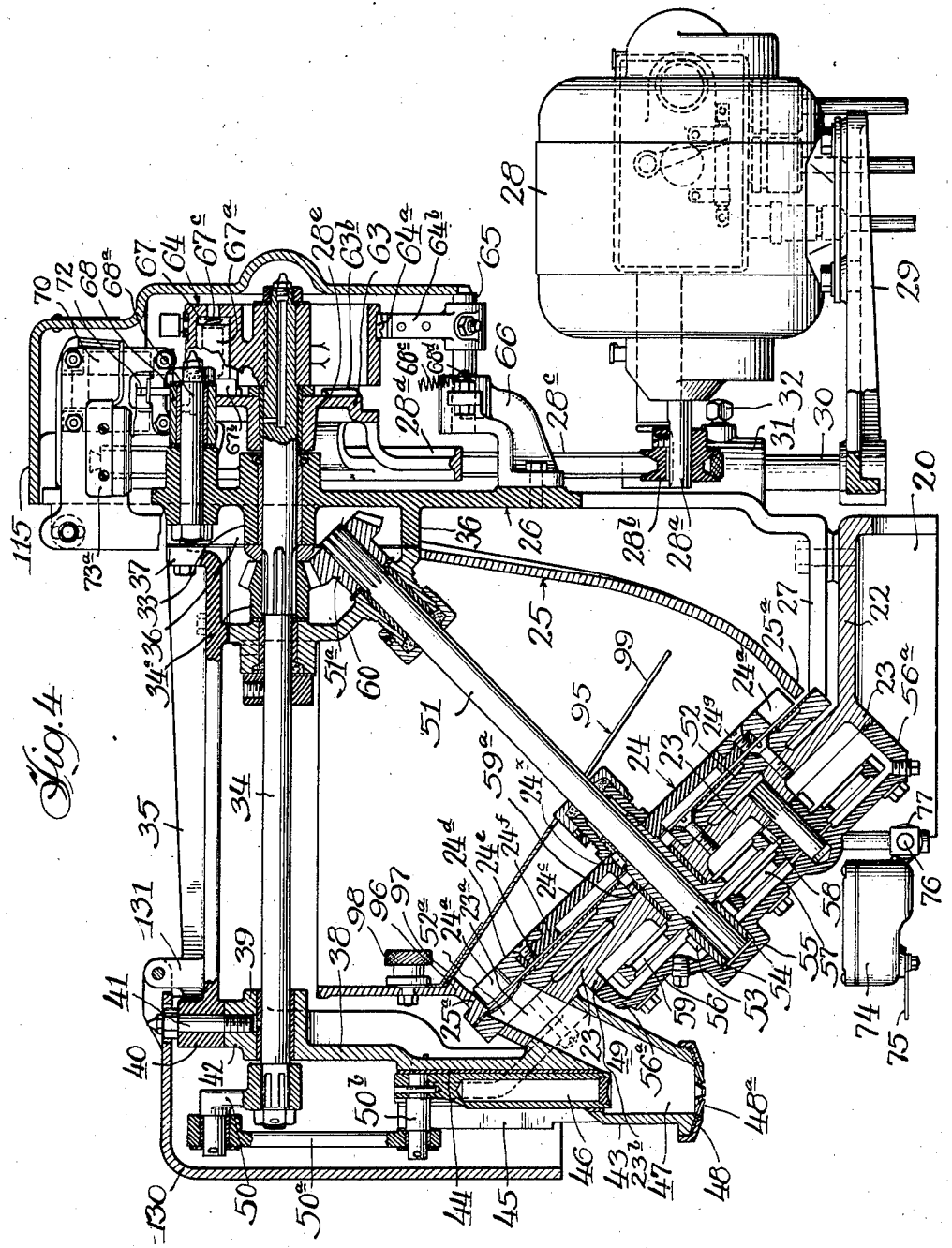

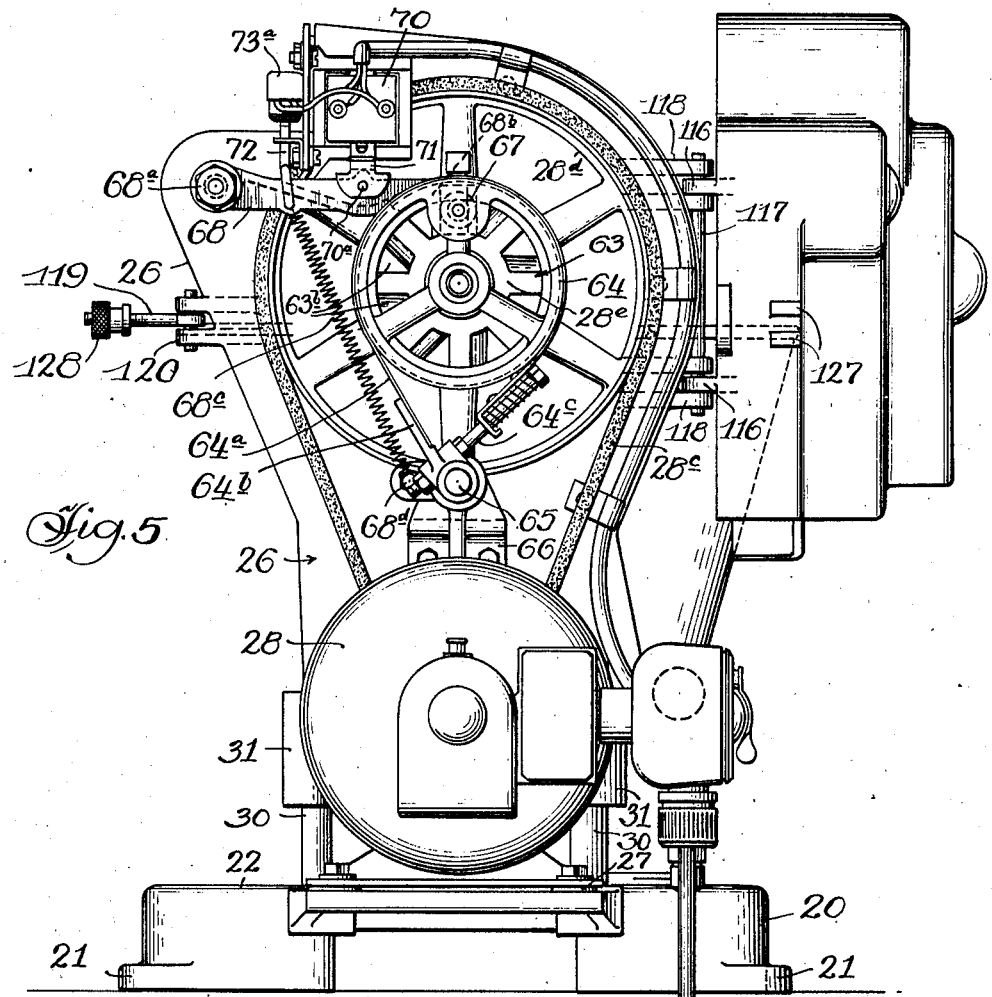
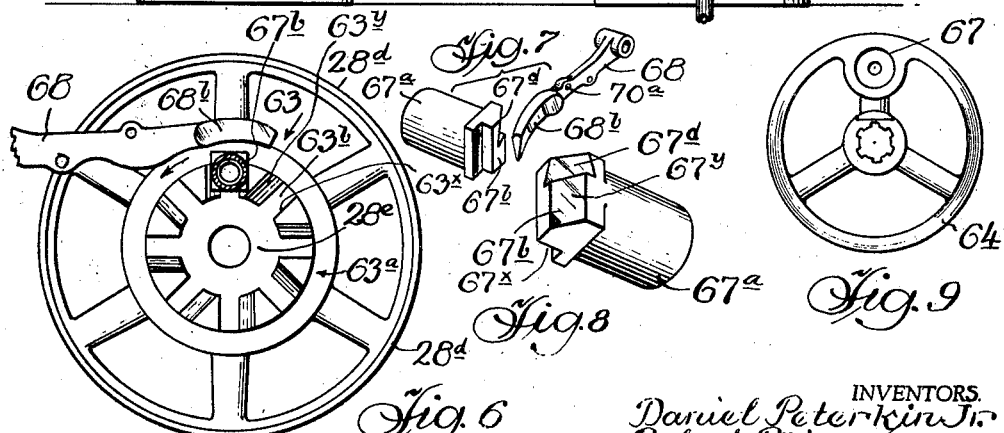

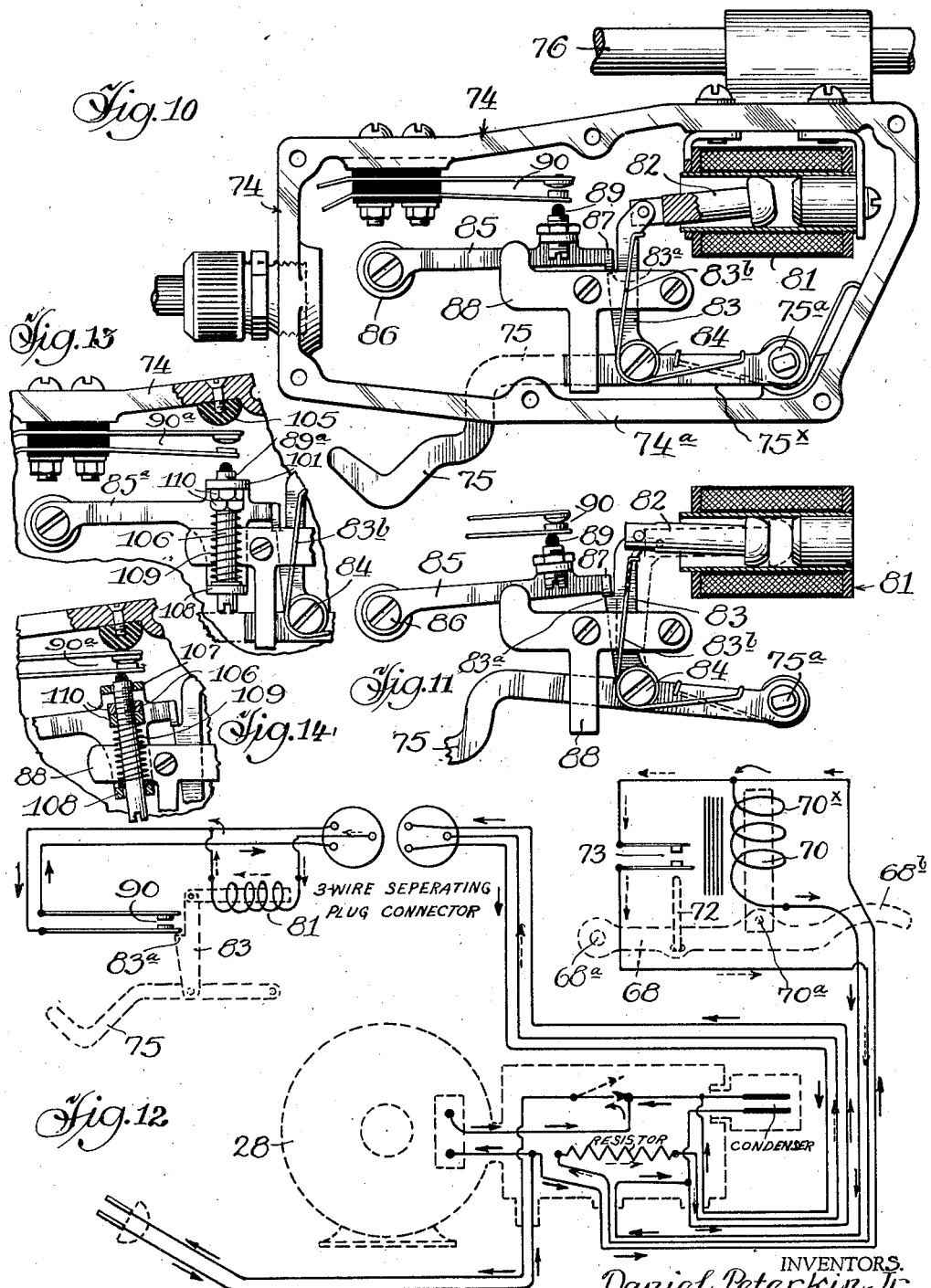

Patented Dec. 15, 1942

2,304,952

UNITED STATES PATENT OFFICE 2,304,952

CLUTCH CONTROL FOR AUTOMATIC DISPENSING DEVICE

Daniel Peterkin, Jr., Chicago, and Robert P. Warren, Kenilworth, Ill., and John M. Binding, Manistee, Mich., assignors to Morton Salt Company, Chicago, Ill., a corporation of Illinois Application May 8, 1939, Serial No. 272,472

5 Claims. (Cl. 192—24)

This invention relates to improvements in automatic dispensing devices and consists of the matters hereinafter described and more particularly pointed out in the appended claims.

The invention relates to a dispensing device more particularly designed for tablets to be fed from the hopper and discharged into cans advanced on a moving conveyor by an intermittently rotated feed disc having circularly, equally spaced apertures, which pick up the tablets and feed them one by one to a chamber, wherein they are arrested and retained until discharged. The machine also includes a reciprocable plunger which operates in timed relation to said feed disc, making one complete revolution for the advance of each aperture of the feed disc, and acting to discharge the tablet retained in the discharge chamber into a can below it.

The improved dispenser is electrically driven by a continuously rotating member which is automatically connected by a clutch to the shaft which drives the plunger and, through suitable gearing, the feed disc, to operate the two in the prescribed timed relation.

One object of the invention is to provide a novel and improved electro-magnetic control for the clutch which is to be actuated by a switch arm in the path of the cans advanced on the conveyor and into which the tablets are to be discharged.

Another object of the invention is to provide an electro-magnetic control for said clutch which includes a tripper arm with a solenoid for actuating it, and another solenoid for de-energizing the first named solenoid, with electric connections adapted to release the tripper arm for disengaging the clutch instantly after it has been actuated in the first instance, thereby insuring a highly efficient operation to deposit a tablet in each can as it passes the dispensing device.

These and other objects and advantages of the invention will appear more fully as we proceed with our specification.

In the drawings:

Figure 1 is a side elevation of the improved dispenser.

Figure 2 is a view showing the same in front elevation.

Figure 4 is a view on a scale similar to Figure 3, showing a vertical section in the plane of the central axis of the hopper as indicated by the line 4—4 of Figure 3.

Figure 5 is a rear end elevation of the dispenser with an enclosing housing in open position to disclose to view the parts enclosed thereby.

Figure 6 is a detail side elevation of the clutch mechanism.

Figure 7 is a perspective view of the clutch dog and tripper arm shown in disassembled relation.

Figure 8 is a perspective view on a larger scale of the clutch dog.

Figure 9 is a side elevation of a sheave or pulley which carries the clutch dog.

Figure 10 is a top plan view on an enlarged scale of the switch arm and the mechanism operated thereby.

Figure 11 is a view of said parts showing them in a different relation.

Figure 12 is a diagram of the electrical connections by which the tripper arm is actuated when the switch arm is struck by a can advancing on the conveyor.

Figures 13 and 14 are fragmentary views of the switch casing and the parts contained therein showing a modified form of the switch mechanism.

Figure 3:
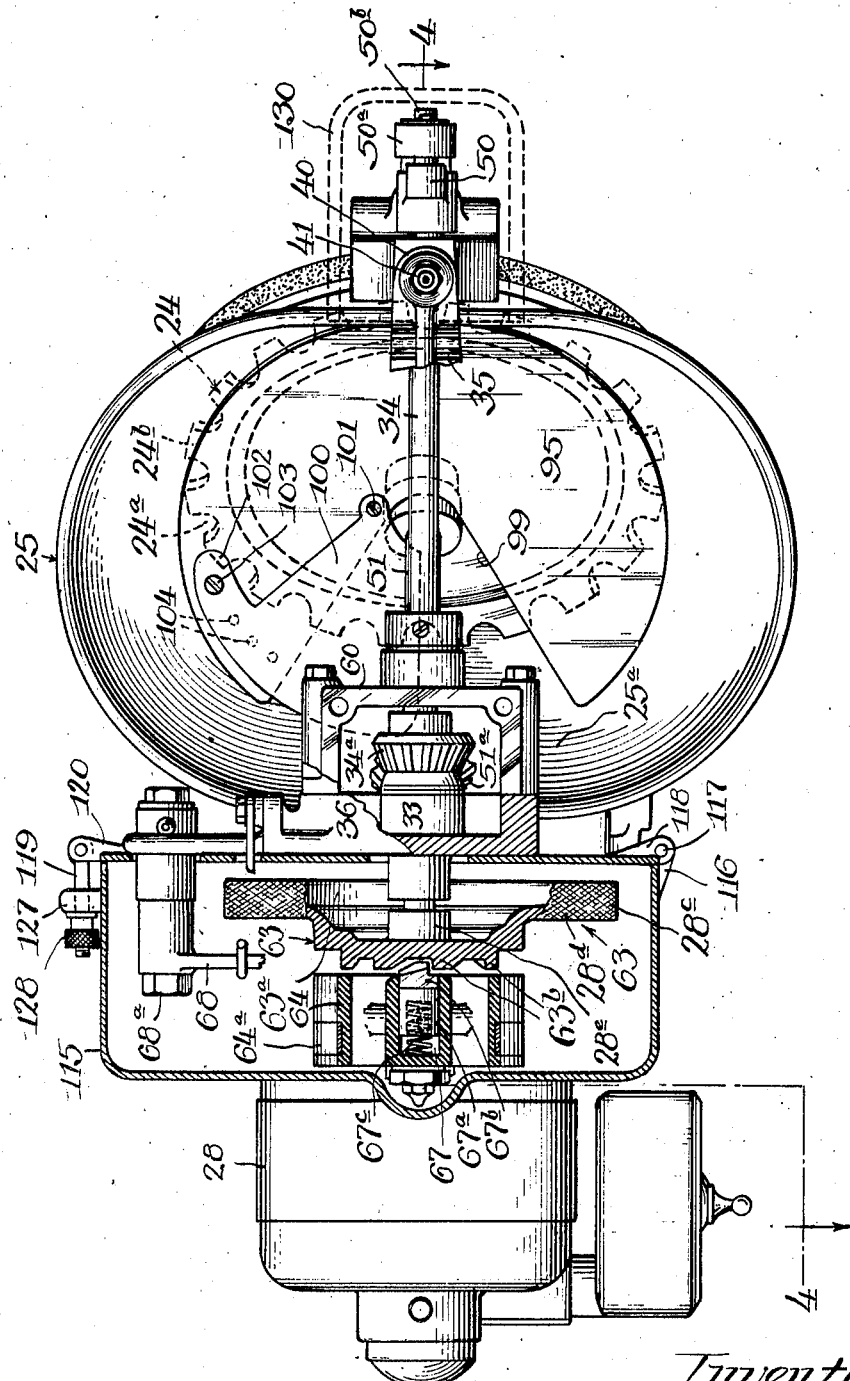
Figure 3 is a top plan view of the dispenser on an enlarged scale, shown partially in section.

Referring now to that embodiment of the invention illustrated in the drawings: 20 indicates a base upon which the dispensing device is mounted. The base itself is designed to be secured by means of ears 21 upon a column or other support (not shown) which is adjustable in height to bring the level of the dispensing device into proper association with the conveyor on which cans are to be fed to the dispenser. The base has a top wall 22 (see Figure 4) which is in part horizontal, extending from the rear towards the front of the dispenser, with an upwardly inclined part 23 which provides support for a feed disc 24 parallel thereto and located at the bottom of a hopper 25.

26 indicates an upright standard having laterally spaced horizontal feet 27 which are mounted on the top wall 22 of the base 20. A motor 28 is supported on a platform 29 at the rear of the dispenser. Said platform is fixed to the bottom ends of laterally spaced upright rods 30, which are adjustably mounted in vertically extending, apertured bosses 31 fixed to said standard 26 and in which they are held by set screws 32.

The standard 26 extends above the hopper 25. It is there provided with a fixed horizontal sleeve 33 projecting to each side of it. In said sleeve bears one end of a horizontal shaft 34. 35 indicates a horizontal bracket spaced above the shaft 34 and fixed at its rear end as indicated at 37 to a forwardly extending rib 36 fixed to the standard 26 and disposed at the sides of and below the sleeve 33. From the forward end of the bracket 35, and beyond the hopper 25, depends a vertical plate 38 which extends transversely of and at right angles to the shaft 34. Said plate has a horizontal bearing sleeve 39 for the forward end of the shaft 34. A vertically apertured boss 40 at the end of the bracket 35, a lag bolt 41 and an internally threaded boss 42 at the top of the plate 38 provide means for rigidly securing the bracket 35 and the plate 38 together.

The plate 38, below the shaft 34, and on its forward side has formed on, or made rigid with it a tubular shell 43 with a bearing sleeve 44 fixed therein. The shell and sleeve have a vertical slot 45 on the front side for pin connection to a vertically reciprocable plunger 46 having bearing in said sleeve 44. Below said bearing sleeve the shell 43 is of somewhat larger diameter to provide a discharge chamber 47, closed at its bottom end by an apertured cap 48 which retains a rubber ring having yielding fingers or points 48ª disposed about the aperture in said cap. A downwardly and forwardly inclined chute 49 opens into the discharge chamber 47 at the rear below the normal position of the plunger 46. An associated opening 23ª in the inclined part 23 of the top plate 22 of the base 20 is aligned with and opens into the chute 49 at its upper end.

Forward of the plate 38 and above the plunger 46 a crank arm 50 is fixed to the end of the shaft 34. Said crank arm is pivotally connected by a pitman 50ª to a pin 50ᵇ fixed to the upper end of the plunger 46 and vertically movable in the slot 45 of the shell 43. Each revolution of the shaft 34 produces a vertical reciprocation of the plunger 46 to depress beyond and through the apertured cap 48 below the yielding fingers 48ª, a tablet previously dropped through the chute 49 into and retained in the discharge chamber 47 by the cap 48 until thus discharged.

51 indicates a downwardly and forwardly inclined shaft, directed at an angle of approximately forty-five degrees to the horizontal shaft 34 and at right angles to the plane of the feed disc 24 which is rotative on said shaft 51. The feed disc 24 fits loosely within the open bottom end 25ª of the hopper 25, which is closed by a circular plate 52 interposed between the base top wall part 23 to which it is secured in close association with the bottom of the feed disc 24.

The shaft 51 extends through suitable apertures in the closure plate 52 and the base wall part 23 and beyond the latter where it has fixed to its end a pinion 53. Said pinion has an elongated hub 54 which has bearing in a central recessed boss 55 of a flanged circular housing plate 56, the flange 56ª of which is secured to an annular rib 23ᵇ on the bottom of the base wall part 23. 57, 58 and 59 indicate reduction gears mounted between the housing plate 56 and the base wall part 23 and interposed between the pinion 53 at the end of the shaft 51 and the feed disc 24, which is keyed to a hub 59ª of the gear 59 as indicated at 24ˣ.

The upper end of the shaft 51 has support and bearing in a housing 60 secured to the bracket 35 and to the rib 36 on the standard 26. The horizontal shaft 34 has supplemental bearing in said housing 60. By interengaging pinions 34ª and 51ª fixed to said shafts 34 and 51, respectively, within said housing, the shaft 51 is driven by the shaft 34. Suitable end thrust bearings to hold each shaft against longitudinal movement in either direction are likewise provided in association with said housing 60 as shown in Figure 4.

The circular plate 52 which closes the bottom of the hopper 25 has a discharge aperture 52ª in line with the aperture 23ª in the base top plate part 23 and the chute 49 leading to the discharge chamber 47. The feed disc 24 is provided with like equal annularly spaced apertures 24ª for gathering tablets from the lower bottom end of the hopper and elevating them singly at intervals into position above the discharge aperture 52ª, through which they drop down the chute 49 into the discharge chamber 47.

The gear connection between the shaft 34 which operates the plunger 46 and the shaft 51 and the reduction gearing connecting the shaft 51 with the feed disc 24 is such as to operate the plunger once in timed relation for each advance of the feed disc to bring a tablet to position to drop into the chute 49 leading to the discharge chamber 47.

The apertures 24ª in the feed disc are preferably, and as illustrated, formed by spaced radial teeth 24ᵇ (see Figure 3) so that they open through the periphery of the disc. Said teeth are spaced to receive the size of tablet to be supplied to the hopper 25, and the apertures are rounded at the bottom approximately to conform to said tablets which are preferably circular in one plane.

The feed disc 24 comprises a center plate 24ᶜ and a toothed or apertured ring 24ᵈ. Said ring is made in two parts, each preferably including an angle of 180 degrees. The ring 24ᵈ at its inner periphery and the center plate 24ᶜ at its outer periphery are provided with complementary overlapping and underlapping flanges 24ᵉ and 24ᶠ, respectively, which are removably secured together by screws 24ᵍ. By this construction rings with apertures or spaces to accommodate tablets of different sizes may be removed and replaced without difficulty, notwithstanding the disposition of the shafts 51 and 34 above them. All that is necessary is to remove the screws 24ᵍ, whereupon the two sections of the ring 24ᵈ may be withdrawn from the center plate 24ᶜ and by manipulating each to straddle the shafts 51 and 34 and the overhanging bracket 35. A similar reverse procedure may bring the parts of a ring with different sized apertures or spacing of teeth to place for attachment to the center plate 24ᶜ.

28ª indicates the motor shaft. When the dispenser is in use the motor is in continuous operation. On the shaft 28ª is fixed a pulley 28ᵇ which is connected by a belt 28ᶜ (see Figures 4 and 5) to a pulley 28ᵈ of large diameter loosely mounted by a rearwardly extending hub 28ᵉ (see Figure 4) on the shaft 34 back of its bearing sleeve 33. Said hub 28ᵉ is integral with a clutch disc 63 at its rear end (see Figures 3 and 5) having equal angularly spaced radial clutch teeth 63ᵇ. Adjacent to said clutch disc and keyed to the shaft 34 is a sheave or pulley 64. It has a peripheral groove in which is engaged a friction spring-controlled brake belt 64ª (see Figure 5) fixed at one end to an arm 64ᵇ and spring-connected at its other end to an opposed arm 64ᶜ, both mounted on a horizontal stud 65 extending rearwardly from and fixed to a bracket 66 rigidly attached to the standard 26.

The pulley or sheave 64 is formed to provide near its periphery a horizontal bearing recess 67 for a clutch dog 67ª. At its forward end adjacent to the clutch disc 63 said dog has a clutch tooth 67ᵇ adapted to be engaged by and locked to one of the radial teeth 63ᵇ of the continuously rotating disc 63. A spring 67ᶜ (see Figure 4) in said recess 67 back of said clutch dog 67ª normally urges said clutch dog to engagement with said clutch disc 63. The clutch tooth 67ᵇ has a square face 67ˣ adapted to be engaged by a like radial face 63ˣ, when the clutch disc is rotating counterclockwise, as shown in Figure 6, and have co-related following inclined faces 67ʸ and 63ʸ to facilitate quick engagement and release.

68 indicates a tripper arm pivoted at 68ª (see Figure 5) to the standard 26 at one side of the drive pulley 28ᵈ in horizontal alignment with the normal, inactive position of the clutch dog 67ª. It is operable in a vertical plane between the clutch disc 63 and the spring actuated clutch dog 67ª. It is normally held down by gravity to engage its cam end 68ᵇ with a co-related cam surface 67ᵈ on the clutch dog 67ª to hold said dog from engagement with the clutch teeth 63ᵇ. Upon a rise of said trip arm 68 the clutch dog 67ª will be released and will be forced to engage one of the clutch teeth 63ᵇ. The shaft 34 will be then rotated by the continuously rotating clutch disc 63 operated by the motor until the trip arm 68 is again interposed to withdraw the spring-controlled clutch dog 67ª. The downward movement of the tripper arm 68 is produced by gravity; but to insure its downward movement, a coiled spring 68ᶜ is preferably provided to connect it to a pin 68ᵈ fixed to the bracket 66 attached to the standard 26.

The tripper arm 68, by means now to be described, is but momentarily raised to release the clutch dog 67ª to be engaged by the clutch disc 63, and is immediately returned to its normal position between said clutch disc and the path of travel of the clutch dog tooth 67ᵇ. Thus when the clutch dog has been rotated to return it to its normal position after it has caused the pulley 64 and the shaft 34 to which it is affixed to make one complete revolution, the tripper arm will release the clutch. And coasting of the pulley 64 to carry the shaft 34 beyond a single revolution will be arrested and stopped by the brake belt 64ª. Thus one operation of the clutch will produce one reciprocation of the plunger 46, and the advance of one aperture 24ª of the feed disc 24 to position in line with the chute 49.

The tripper arm 68 is operated to raise and release the spring-controlled clutch dog 67ª for engagement with the clutch disc 63 by a solenoid 70 (see Figure 5). 71 indicates the armature of said solenoid 70 which is connected to the tripper arm 68 at a point 70ª intermediate the pivotal point 68ª of said tripper arm and its cam end 68ᵇ. Intermediate the point 70ª and the pivotal connection 68ª of said tripper arm is an upright switch arm 72 adapted to produce contact of switch points 73 in a switch box 73ª. (See Figures 5 and 12.) When the solenoid 70 is energized, the switch arm 72 is raised to produce such contact.

At the front of the dispenser is a casing 74 located at the near side of the conveyor (not shown) on which are fed in succession the containers to which the tablets are to be supplied. 75 indicates an arm projecting from the casing 74 into the path of said containers to contact the near side of each of them as it passes the dispenser.

The casing 74 is mounted on a horizontal rod 76 located in front of the base and extending parallel to the path of the conveyor. Said rod 76 is mounted in eyes 77 at the bottom ends of vertical rods 78 spaced in the direction of the travel of the conveyor (see Figures 1 and 2) which rods are mounted in eyes 79, 79 of horizontally fore and aft adjustable bracket plates 80, 80 mounted on top of the base 20. By this arrangement the casing 74 may be adjusted both vertically and horizontally in either direction in order to meet the requirements of any location of the conveyor belt that may be presented.

By the contact aforesaid and electrical connections now to be described, each time said arm 75 is engaged by a can or container, the solenoid 70 is momentarily energized to raise the tripper arm 68 and release the clutch dog 67ª to be engaged by the clutch disc 63. At the same time the switch arm 72 closes contacts in the switch box 73ª, whereupon by other electro-magnetic controls later to be described, the solenoid 70 is immediately de-energized and the arm 68 is restored to its original position in the path of the clutch dog 67ª to disengage it from the clutch disc 63.

Within the casing 74 is fixed a solenoid 81. 82 indicates the armature of said solenoid. The arm 75 which contacts the containers is disposed in a plane below the casing 74 and is fixed to a stud 75ª rotatively mounted in the bottom wall of the casing. Said stud projects into the casing where it has fixed to it an arm 75ˣ which extends parallel to the arm 75. 83 indicates an arm extending in the plane of, approximately at right angles to, and pivoted to the arm 75ˣ at 84. 85 indicates an arm pivoted at 86 to the bottom wall of the casing to swing in a horizontal plane and having an end detent 87 which normally engages a shoulder 83ª on the arm 83. Said engagement is maintained by a spring 83ᵇ reacting between the arm 83 and the arm 75ˣ. Movement of the several arms in a horizontal plane is guided by a bracket 88 fixed to the casing 74. The arm 83 carries an insulated stud 89 which is located in line with a pair of spring contacts 90 which are normally disengaged.

When a can strikes the arm 75, it is swung upon its pivot 75ª; and by the engagement of the shoulder 83ª of the arm 83, the stud 89 is moved to close the contacts 90 upon each other. (See Figures 10 and 11.) In this movement the arm 83 brings the armature 82 of the solenoid into alignment with the magnet at the base of the solenoid, but is not closed thereon. As shown in Figure 12 by the full line arrows, the contacts 90 are in circuit with the field 70ˣ of the solenoid 70, so that the closing of the contacts 90 will energize the solenoid 70 and cause the armature to lift the tripper arm 68. This lifts the switch arm 72 to contact the points 73 in the switch box 73ª. Then by the current through the conductors indicated by the dotted arrows (see Figures 11 and 12) the solenoid 81 in the casing 74 is energized to bring the armature 82 into contact with the magnetic base of said solenoid, thereby shifting the arm 83 to remove its shoulder 83ª from the detent 87 at the end of the arm 85 and withdrawing the stud 89 from its position, opening the contacts 90. The circuit is then immediately broken and the solenoid 70 de-energized, thus releasing the arm 68 to swing down into position in the path of the clutch dog 67ª to release the same from the clutch disc 63.

As indicated in the diagram of the electrical connections shown in Figure 12, a "resistor" is connected in series with the field of the solenoid 81, as shown by the dotted arrows. The purpose of this "resistor" is to reduce the flow of current and prevent undue heating of said solenoid. A "condenser" is disposed in circuit with the switch points 90 as shown by the solid arrows. The purpose of the "condenser" is to suppress the arc and reduce the sparking between said points when making or breaking contact. The three wires for said circuits are disposed as shown in two sets, which are adapted to be connected by a "3-wire separating plug connector."

A baffle plate 95 (see Figures 3 and 4) is fixed within the hopper above the feed disc 24. Said baffle plate is inclined a little less to the vertical than is the disc 24. It rests at its upper edge (at the left as shown in Figure 4) on a shoulder 96 formed on the front wall of the hopper. It is fixed to an angle plate 97 which is removably secured to said front wall by a thumb bolt 98. At its edges it bears upon the conical side walls of the hopper as shown in Figure 3. The baffle plate has an angular opening 99 through which the tablets drop into the space below the baffle plate. And the baffle plate by means of the opening 99 is permitted to straddle the shaft 51 so as to be removable when it is necessary to remove and replace a disc 24.

To vary the size of the opening 99, the baffle plate is preferably provided with an adjustable gate 100 movable to reduce and vary the width of the effective opening 99 to accommodate tablets of different sizes. Said gate as shown in Figure 3 is made in the form of a segment of a circle and is pivoted at 101 to the baffle plate at one side of the opening 99. It has a lateral extension 102 near its periphery which carries a screw 103 for engagement in one or the other of holes 104 in the baffle plate for securing said gate in different positions to adjust the effective width of the opening 99.

It may sometimes happen, due to improper adjustment of the position of the dispenser, and particularly of the switch arm 75 with reference to the path of travel of the cans advanced on the conveyor, that the arm 85 carrying the stud 89 will be forced to swing through an angle wider than necessary to merely bring the spring contacts 90 into engagement. This will produce an abnormal bend in the spring metal arms of said contacts for each operation of the arm 85. After long continued repetitions of such bending of said arms, they may be caused to assume a fixed bend or distortion which will interfere with or prevent the proper engagement of the contacts 90 at each operation of the switch arm 75. To obviate this, we provide the construction shown in Figures 13 and 14.

In said figures, 90a indicates the spring contacts, and 89a the stud carried by the arm 85a. On the side wall of the casing 74 in line with the contacts 90a and with the stud 89a is mounted an insulation button 105 immediately back of the proximate contact to arrest movement thereof tending to distort it. The stud 89a is fixed to a spring-controlled pin 106 mounted for longitudinal movement in ears 107 and 108 rising from the arm 85a. A coiled spring 109 is interposed between the ear 108 and adjustable lock nuts 110 on said pin near the ear 107.

In this construction when the arm 85a moves the stud 89a through a wider angle than is necessary to bring the spring contacts 90a into engagement, the movement of the engaged spring contacts 90a will be arrested by the button 105 and the spring controlled pin 108 carrying said stud 89a will yield to permit such arrest.

The operation of the improved dispenser will be obvious from the foregoing description. The dispenser is set upon and its base secured by the ears 21 to a suitable column placed along side a traveling conveyor upon which are to be advanced at intervals cans or other containers into which tablets of salt or other seasoning are to be deposited—one into each can, as it passes below the discharge chamber 47. By suitable adjustment of the height of the column or other support, the dispenser is brought to proper horizontal relation with the conveyor so that the retaining cap 48 will be at the required height above the plane of the travel of the open tops of the cans, for the end of the plunger 46 to effectively descend below said plane to depress the tablet discharged into the contents of said can. The dispenser and its support must also be adjusted in transverse relation to the traveling conveyor so that the actuating switch arm 75 projecting from the casing 74 will be properly engaged by each advancing can to be operated thereby. Nice adjustments of the casing 74 to this end may be made by the means as described, making universal adjustment of said casing possible.

The hopper 25 is filled with tablets of the weight required for the contents of the cans. Said tablets drop upon the baffle plate 95 and are guided through the opening 99 therein into the lowest part of the hopper below the level of said plate, coming to rest upon the disc or pick-up plate 24. The baffle plate 95 retains the talets in the hopper above it, leaving a substantially free space above the feed or pick-up disc, except in the area below the baffle plate defined by the effective opening 99 therein.

The electric motor is then started and the traveling conveyor advancing the filled containers is put into operation. But just prior thereto, the dispenser is operated to rotate the feed disc 24 to drop a tablet into the discharge chamber 47 to be retained therein by the yielding fingers 48a.

As each can advances to position below the discharge chamber 47, it strikes and operates the switch arm 75. This closes the spring contacts 90, the one upon the other, closing the circuit including the field of the solenoid 70. The trip arm 68 is instantly raised to release the spring actuated clutch dog 67a to be locked to one of the teeth 63b of the continuously rotating clutch disc 63. But in the very rise of the trip arm 68, the switch arm 72 carried thereby closes the contacts 73 in circuit with the field of the solenoid 81, momentarily energizing said solenoid to release the spring-controlled arm 83, which holds the main circuit contacts 90 in closed relation. Instantly the main circuit is broken. As a result, both solenoids 70 and 81 are de-energized and the tripper arm 68 is released to be positively returned by gravity, supplemented by the spring 68c to first position, with its cam end 68b in position to be engaged by the cam surface 67c of the clutch dog to disengage it.

The operation of the tripper arm 68, both to release it from holding the clutch dog from engagement with the continuously rotating clutch disc and to return it to position to raise said dog from engagement with said clutch disc, is electro-magnetically controlled, and efficient operation of the dispenser to insure the deposit of a tablet in each can advanced on the conveyor is insured.

The pulley 28ᶜ, the tripper arm 68 and the solenoid 70 and mechanism connected therewith, together with the clutch 64 with the clutch dog 67ᵃ, are all enclosed by a housing or casing 115. Said housing is closed at the sides, top and back, but is open at the front. It is hinged at one side by lugs 116, 116 which are engaged upon a pintle 117 carried by ears 118 extending rearwardly from the upright standard 26, as shown in Figure 5, wherein the housing has been swung through 90 degrees to disclose the parts enclosed thereby. The open forward side of the housing closes against the standard 26. This housing provides means for protecting the parts enclosed thereby and gives ready access to said parts for inspection or repair. It is locked in closed position in a familiar manner by a swinging arm 119 pivoted to a lug 120 on the standard 26, and engageable between spaced ears 127 within which it is held by a thumb nut 126.

A second housing 130 (see Figures 1 and 4) encloses the plunger and its operating mechanism. Said housing is hinged at its top rear edge upon spaced lugs 131 rising from the bracket arm 35 so that it may be swung upwardly away from the part is encloses.

While in describing our invention we have referred to many details of construction and arrangement of parts, it will be understood that the invention is not limited thereto except as may be pointed out in the appended claims.

We claim as our invention:

1. In a dispenser including a feed disc, shaft, and a vertically reciprocable plunger operable in predetermined timed relation, a horizontal shaft for operating said feed disc and plunger, a continuously rotating member, clutch means for intermittently connecting said continuously rotating member to one of said shafts, and electro-magnetic means for controlling the operation of said clutch means including a normally open circuit, spring arm contacts to close said circuit, a movable arm for operating said spring arm contacts, a yielding insulation stud carried by said arm, and an insulation stop back of said spring contacts adapted to arrest the movement of said spring arm contacts when they are engaged.

2. In a dispenser including a feed disc and a vertically reciprocable plunger operable in predetermined timed relation, a horizontal shaft for operating said feed disc and plunger, a continuously rotating drive member loosely mounted on said horizontal shaft, a mechanical clutch element fixed to said continuously rotating drive member, a spring-controlled, normally restrained, clutch dog carried by said horizontal shaft adapted for engagement with said clutch element, a tripper arm for releasing said clutch dog for engagement with said clutch element, electro-magnetic means for raising said tripper arm, and a second electro-magnetic means in circuit with said first named electro-magnetic means adapted to de-energize the magnet of said first named electro-magnetic means in the rising movement of said tripper arm.

3. In a dispenser including a feed disc and a vertically reciprocable plunger operable in predetermined timed relation, a horizontal shaft for operating said feed disc and plunger, a continuously rotating clutch element loosely mounted on said horizontal shaft, a spring-controlled, normally restrained, horizontally movable clutch dog carried by said horizontal shaft, a tripper arm disposed transversely of said horizontal shaft, operable in a vertical plane and normally engaged between said clutch element and said clutch dog to hold said clutch dog from engagement with said clutch element, electro-magnetic means for raising said tripper arm to release said clutch dog for engagement with said clutch element, and electro-magnetic means to release said tripper arm from said first named electro-magnetic means for return to its normal position.

4. In a dispenser including a feed disc and a vertically reciprocable plunger operable in predetermined timed relation, a horizontal shaft for operating said feed disc and plunger, a continuously rotating clutch element loosely mounted on said horizontal shaft, said clutch element having a plurality of radial teeth, a pulley fixed to said horizontal shaft in a plane adjacent to said clutch element, a spring-controlled, normally restrained, horizontally movable clutch dog mounted in said pulley adapted to be engaged by said teeth, a tripper arm disposed transversely of said horizontal shaft, operable in a vertical plane and normally engaged between said clutch element and said clutch dog to hold said clutch dog from engagement with said clutch element, electro-magnetic means for raising said tripper arm to release said clutch dog for engagement with a tooth of said clutch element, and electro-magnetic means to immediately release said tripper arm from said first named electro-magnetic means for return to its normal position.

5. In a dispenser including a feed disc and a vertically reciprocable plunger operable in predetermined timed relation, a horizontal shaft for operating said feed disc and plunger, a continuously rotating clutch element loosely mounted on said horizontal shaft, a spring-controlled, normally restrained, horizontally movable clutch dog carried by said horizontal shaft, a horizontal tripper arm operable in a vertical plane and normally engaged between said clutch element and said clutch dog to hold said clutch dog from engagement with said clutch element, a solenoid for lifting said tripper arm to release said clutch dog after engagement with said clutch element, a normally open main circuit including said solenoid, spring arm contacts for closing said main circuit, a second solenoid, a normally open shunt circuit including said second solenoid, a second set of spring arm contacts operable by said tripper arm for closing said shunt circuit, and means intermediate said second named solenoid and said first named spring arm contacts for opening said main circuit whereby said tripper arm is released.

DANIEL PETERKIN, Jr.
ROBERT P. WARREN.
JOHN M. BINDING.